United States Patent [19]

Braden et al.

[11] Patent Number: 5,332,507
[45] Date of Patent: Jul. 26, 1994

[54] RECOVERY OF OIL FROM WASTE OIL FLUIDS

[75] Inventors: Michael L. Braden, Stafford, Tex.; Wayne M. Carlson, Batavia, Ill.; Manian Ramesh; Ananthasubramanian Sivakumar, both of Naperville, Ill.

[73] Assignee: Nalco Chemical Company, Naperville, Ill.

[21] Appl. No.: 24,560

[22] Filed: Mar. 1, 1993

[51] Int. Cl.$^5$ .............................. B01D 17/05
[52] U.S. Cl. .................... 210/708; 208/180; 208/188; 210/712; 210/728; 210/734; 252/341; 252/358
[58] Field of Search ............ 208/180, 187, 188; 210/708, 712, 725, 727, 728, 734; 252/341, 358

[56] References Cited

U.S. PATENT DOCUMENTS

| | | |
|---|---|---|
| 4,588,508 | 5/1986 | Allenson et al. ............ 210/708 |
| 4,835,234 | 5/1989 | Valint et al. ............... 210/708 |
| 5,006,590 | 4/1991 | Fakeda et al. .............. 524/458 |
| 5,032,285 | 7/1991 | Braden et al. .............. 210/708 |
| 5,176,847 | 1/1993 | Kremer ..................... 210/708 |

*Primary Examiner*—Peter A. Hruskoci
*Attorney, Agent, or Firm*—Robert A. Miller; Joseph B. Barrett; James J. Drake

[57] ABSTRACT

The invention provides a method of recycling waste oil fluids including dispersed solids and emulsified water. According to the method, the waste oil is treated with an effective amount of a dispersion of a water-soluble cationic polymer.

7 Claims, No Drawings

RECOVERY OF OIL FROM WASTE OIL FLUIDS

BACKGROUND OF THE INVENTION

1. Field of the Invention

The invention is directed to compositions and methods for recovering oil from waste oil fluids; and more particularly, the invention is directed to a method of recovering oil from waste oil fluids using water-soluble polymers dispersed in a concentrated salt media.

2. Description of the Prior Art

The recovery and recycling of oil from waste oil is becoming more important due to economics and stricter environmental EPA regulations regarding the disposal of waste oil. Generally, waste oils include dispersed solids and emulsified water. The solids and water should be removed if the oil is to be recycled. Untreated waste oils are considered hazardous and usually cannot be landfilled. Stricter regulations are driving customers to recycle more and to invest in the treatment of waste oils.

Table 1 classifies waste oils in the following industrial categories:

TABLE 1

| | Classification of Oily Wastes | | |
|---|---|---|---|
| | % OIL | % WATER | % SOLIDS |
| Refining - Crude | 90-95 | 5-10 | 0-5 |
| Machining - Cutting | 50-80 | 20-50 | 0-20 |
| Waste Oil Sludges | 40-50 | 40-50 | 5-10 |
| Steel - Rolling Oils | 80-95 | 5-20 | 0-5 |

*The Nalco Water Handbook*, 1st Ed., 1979, page 11.

Refinery waste oil comes from two different sources: (1) Skimmings from the water clarification equipment, i.e., DAFs, APIs, and consisting mainly of crude oil; and, (2) Leakage from processes collected via traps and drains throughout the plant. This oil is usually sent to a wastewater treatment plant (WWPT).

One type of waste oil is formed during the process of removing dispersed oil from wastewater in wastewater treatment plants. The oil (called "float" or "skimmings") is concentrated in clarification vessels such as dissolved air floatation units (DAFs), induced gas floatation units (IGFs), corrugated plate interceptors (CPIs), and holding tanks. The oil floats to the top of these units, is removed by mechanical means and then stored. This waste oil may then be disposed of by incineration, sent to oil reclamation sites, or treated on-site. These waste oils have a minimum of 50% to 95% oil and contain emulsified water and solids which are stabilized by chemicals used to remove the oil from the waste water.

Several other examples of waste oil include waste oil from: oil production, oil refineries, aluminum and steel mills, laundries, automotive and chemical processing industries. One large source of waste oil is used motor oils.

One of the most effective methods of removing the solids and water in waste oil fluids is through the use of the chemical demulsifying aids. Typically, this application requires 10 to 100 times the dosage needed for other emulsion breaking applications, such as removing water from crude oil.

Historically, dry polymers, solution polymers, inverse emulsion latexes and metal ions have been used to assist in the treatment of waste oil. Each material has its own advantages and disadvantages. While dry polymers have the benefit of being extremely concentrated, thereby reducing shipping costs, the equipment to dissolve the polymers is expensive and is not available to all end-users on site.

Latex polymers also suffer from problems but are used quite frequently. Latex polymer preparations include 30-35% solids dispersed in oil. The latex polymer must be also inverted prior to use. Numerous problems associated with this feeding method have caused many customers to avoid latex polymers. In addition, the latexes generally have a very narrow treating range, often resulting in over-treatment at higher dosages.

Although solution polymers require no prior make up, the percent solids and molecular weight are severely limited due to the nature of the material. These materials are often used to break water-in-oil emulsions, but they are unable to precipitate the dispersed water and solids, thus requiring another chemical to accomplish this.

The water-soluble dispersion polymers of the invention offer many solutions to these problems and represent a new method for recycling and recovering industrial waste oils.

SUMMARY OF THE INVENTION

One aspect of the invention provides a method of recovering or recycling waste oil fluids by removing solids and emulsified water from the waste oil. According to the method, the water oil fluid is treated with an effective amount of a dispersion of a water-soluble cationic polymer. The dispersion of the water-soluble cationic polymer is prepared by polymerizing a water-soluble monomer mixture containing at least 5 mole % of a cationic monomer represented by general formula (I) and at least 5 mole % of acrylamide or methacrylamide in an aqueous solution of a polyvalent anionic salt. The polymerization is carried out in the presence of a dispersant polymer. The dispersant polymer is a water-soluble cationic polymer which is soluble in the aqueous solution of the polyvalent anionic salt. Also, the dispersant polymer contains at least 20 mole % of cationic monomer units represented by general formula (II):

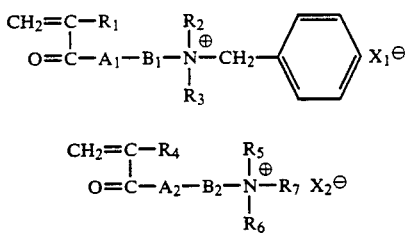

wherein $R_1$ and $R_4$ are each H or $CH_3$; $R_2$, $R_3$, $R_5$ and $R_6$ are each an alkyl group having 1 to 2 carbon atoms; $R_7$ is a hydrogen atom or an alkyl group having 1 to 2 carbon atoms; $A_1$ and $A_2$ are each an oxygen atom or NH; $B_1$ and $B_2$ are each 2 to 4 carbon atoms or a hydroxypropyl group and $X_1$- and $X_2$- are each a counter anion.

A further aspect of the invention provides that the polymerization is further carried out in the presence of a seed polymer. The seed polymer is a water-soluble cationic polymer which is insoluble in the aqueous solution of the polyvalent anionic salt. The seed polymer also contains at least 5 mole % of cationic monomer units represented by the general formula (I).

According to one preferred embodiment, the water-soluble monomer mixture further contains at least 5 mole % of a cationic monomer represented by the general formula (II). The multivalent anionic salt preferably comprises a phosphate, a sulfate or a mixture thereof.

DESCRIPTION OF THE PREFERRED EMBODIMENTS

The invention provides a superior method for recovering or recycling waste oil fluids by removing the solids and emulsified water from the waste oil. A new class of water-soluble dispersion polymers have been discovered to be more effective in removing solids and emulsified water from waste oil fluids than currently available chemical treatments. As will be discussed in more detail below, the polymer dispersion of the invention is prepared in an aqueous solution of a polyvalent anionic salt. The polymer dispersion of achieves fine particle sizes and aqueous solubilities not available with other polymers used for this application.

The dispersion polymers of the invention offer numerous advantages which have previously been unavailable to recyclers of waste oil fluids. The polymers are synthesized entirely in water and, unlike latex polymers, there is no oil solvent. This is important since: the polymers do not present a fire hazard; an additional oil is not added to the waste oil which is to be treated; dissolution of the polymer requires only the addition of water—no special activators are needed; the ability for these materials to dissolve/invert is superior to that of oil dispersion latexes; and the polymers may be diluted to virtually any concentration by using appropriately concentrated salt water. Another major advantage is that the bulk viscosity of the polymer is low, unlike some oil dispersion latex polymers. This physical property enables any standard chemical pump to deliver the material at the injection site.

According to the method, the polymers of the invention are added to a waste oil. The polymers are added in an effective amount of from 0.5 to about 500 ppm. More preferably, the amount of the polymer in the produced water is from 1 to about 200 ppm; and most preferably from about 4 to about 100 ppm. It should be noted, however, that there does not appear to be a maximum dosage at which the polymers adversely affect the system. It does appear that at some higher doses the beneficial affect plateaus, and on a cost basis such higher doses, probably above about 500 ppm, are not cost effective. The polymers of the invention are preferably added to the system in neat form. However, in some applications, the polymers can be added as an aqueous solution.

Once the polymers of the invention are added to the waste oil, the treated waste oil is preferably agitated. The polymers of the invention will cause the dispersed solids and the emulsified water to separate from the waste oil and sink to the bottom of the vessel as a floc or precipitate. The solids are subsequently removed from the bottom of the vessel and usually landfilled. The water is sent to a wastewater treatment plant. The treated waste oil can now be recovered or recycled into an industrial process, such as in a refinery, or other commercial use.

The preferred polymers of the invention are manufactured by Hymo Corporation, Japan. Preferred polymer preparations are available from Hymo Corporation under the trade name designations DR-2570, DR-3000 and DR-4000. Methods for manufacturing the polymer dispersion used in the invention is described in detail in U.S. Pat. Nos. 5,006,590 and 4,929,655, assigned to Kyoritsu Yuki Co., Ltd., Tokyo, Japan. The disclosures of these two patents are incorporated herein.

According to the invention, the polymer dispersion used to treat the produced water is prepared from a water-soluble monomer mixture containing at least 5 mole % of a cationic monomer represented by the general formula (I):

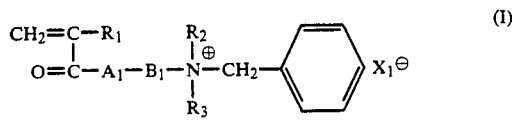

wherein $R_1$ is H or $CH_3$; $R_2$ and $R_3$ are each an alkyl group having 1 to 2 carbon atoms; $A_1$ is an oxygen atom or NH; $B_1$ is an alkyl group having 2 to 4 carbon atoms or a hydroxypropyl group and $X_1$ is a counter anion. The above water-soluble monomer mixture is soluble in the aqueous solution of the polyvalent anionic salt. The polymer generated from the monomer mixture is, however, insoluble in the aqueous polyvalent anionic salt solution. The polymer of the monomer mixture can also be used as the seed polymer. The seed polymer is described in detail below.

The above cationic monomer represented by the general formula (I) preferably is a quaternary ammonium salt obtained by the reaction of benzyl chloride and dimethylaminoethyl acrylate, diethylaminoethyl acrylate, dimethylaminohydroxypropyl acrylate, dimethylaminopropyl acrylamide, dimethylaminoethyl methacrylate, dimethylaminoethyl methacrylate, diethylaminoethyl methacrylate and dimethylaminopropyl methacrylamide.

Monomers preferably copolymerized with the cationic monomer represented by the general formula (I) includes acrylamide, methacrylamide and the cationic monomers represented by the general formula (II):

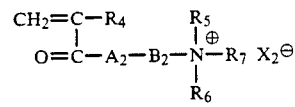

wherein $R_4$ is H or $CH_3$; $R_5$ and $R_6$ are each an alkyl group having 1 to 2 carbon atoms; $R_7$ is H or an alkyl group having 1 to 2 carbon atoms; $A_2$ is an oxygen atom or NH; $B_2$ is an alkyl group having 2 to 4 carbon atoms or a hydroxypropyl group and $X_2$ is a counter anion.

Preferable monomers represented by the formula (II) include the ammonium salts of dimethylaminoethyl acrylate, diethylaminoethyl acrylate, dimethylaminopropyl acrylamide, diethylaminopropyl acrylamide and dimethylhydroxypropyl acrylate, dimethylaminoethyl methacrylate, diethylaminoethyl methacrylate, dimethylaminopropyl methacrylamide, diethylaminopropyl methacrylamide and dimethylhydroxypropyl methacrylate as well as the methylated and ethylated quaternary salts. Among the more preferable cationic monomers represented by the general formula (II) are the salts and methylated quaternary salts of dialkylaminoethyl acrylate and dialkylaminoethyl methacrylate. The concentration of the above-mentioned monomers in the polymerization reaction mixture is suitably in the range of 5 to 30% by weight.

The polyvalent anionic salt to be incorporated in the aqueous solution according to the present invention is suitably a sulfate, a phosphate or a mixture thereof. Preferable salts include ammonium sulfate, sodium sulfate, magnesium sulfate, aluminum sulfate, ammonium hydrogenphosphate, sodium hydrogenphosphate and potassium hydrogenphosphate. In the present invention, these salts may be each used as an aqueous solution thereof having a concentration of 15% or above.

A dispersant polymer is present in the aqueous anionic salt solution in which the polymerization of the above monomers occurs. The dispersant polymer is a water-soluble high molecular weight cationic polymer. The dispersant polymer is soluble in the above-mentioned aqueous salt solution. The dispersant polymer is preferably used in an amount of from 1 to 10% by weight based on the total weight of the monomers. The dispersant polymer is composed of 20 mole % or more of cationic monomer units represented by the formula (II). Preferably the residual mole % is acrylamide or methacrylamide. The performance of the dispersant is not greatly affected by molecular weight. However, the molecular weight of the dispersant is preferably in the range of 10,000 to 10,000,000. According to one embodiment of the invention a multifunctional alcohol such as glycerin or polyethylene glycol is coexistent in the polymerization system. The deposition of the fine particles is smoothly carried out in the presence of these alcohols.

For the polymerizations a usual water-soluble radical-forming agent can be employed, but preferably water-soluble azo compounds such as 2,2'-azobis(2-amidinopropane) hydrochloride and 2,2'-azobis(N,N'-dimethyleneisobutylamine) hydrochloride are used.

According to one embodiment of the invention, a seed polymer is added before the beginning of the polymerization of the above monomers for the purpose of obtaining a fine dispersion. The seed polymer is a water-soluble cationic polymer insoluble in the aqueous solution of the polyvalent anionic salt. The seed polymer is preferably a polymer prepared from the above monomer mixture by the process described herein. Nevertheless, the monomer composition of the seed polymer need not always be equal to that of the water-soluble cationic polymer formed during polymerization. However, like the water-soluble polymer formed during polymerization, the seed polymer should contain at least 5 mole percent of cationic monomer units represented by the general formula (I). According to one embodiment of the invention, the seed polymer used in one polymerization reaction is the water-soluble polymer prepared in a previous reaction which used the same monomer mixture.

The following Example is presented to described preferred embodiments and utilities of the invention and are not meant to limit the invention unless otherwise stated in the claims appended hereto.

EXAMPLE 1

A chemical free sample of waste oil was obtained from the DAF skimmings at an oil refinery. Six ounce bottles were filled with 100 ml of the waste oil. The chemical treating agents, listed in Table 2 below, were added at the listed dosages. The dosages for each chemical treating agent are listed in Table 2 in parts per million. The vials were capped and shaken vigorously. After the vials were shaken, they were placed in a 180° F. water bath for thirty minutes. After thirty minutes of resting in the water bath, the vials were shaken again and replaced in the water bath. The vials were then placed in a centerfuge for three minutes. Afterwards, the vials were removed and the solids, water drop, water clarity, rag layer, and free oil were recorded.

Referring to the data summarized in Table 2 below, the treating agents were: NALCO® 7717, NALCO® 7192, and DR-3000. NALCO 7717 is a surfactant preparation which is generally used in combination with other chemical treatments to treat waste oils. NALCO 7192 is a latex polymer preparation generally used in association with a surfactant to remove solids and water from these types of waste oils. DR-3000 is a commercial preparation of the polymers of the present invention. As shown in the data, solids were removed by all the chemical treatments. All the other indices of performance were generally comparable for all the chemical treatments.

TABLE 2

| Chemical | Dosage | Solids | Water Drop | Water Clarity | Rage | Oil |
|---|---|---|---|---|---|---|
| 7717/7192 | 500/50 | WW | 20 | Clear | 0 | 80 |
| 7717/DR-3000 | 500/50 | WW | 18 | Clear | Trace | 75 |
| 7717/DR-3000 | 500/75 | WW | 20 | Clear | 0 | 80 |
| 7717/7192 | 1000/50 | WW | 26 | Clear | 0 | 74 |
| 7717/DR-3000 | 1000/75 | WW | 27 | Clear | 0 | 73 |
| Blank | 0 | 0 | 0 | Clear | 40 | 60 |

WW = Water-wet solids

Changes can be made in the composition, operation and arrangement of the method of the present invention described herein without departing from the concept and scope of the invention as defined in the following claims:

We claim:

1. A method of recovering or recycling waste oil fluids which include at least about 40% oil, dispersed solids and emulsified water, the method comprising the step of treating the waste oil with an effective amount of a surfactant and a dispersion of a water-soluble cationic polymer, said dispersion of the water-soluble cationic polymer being prepared by polymerizing a water-soluble monomer mixture containing a least 5 mole % of a cationic monomer represented by general formula (I) and at least 5 mole % of acrylamide or methacrylamide in an aqueous solution of a polyvalent anionic salt, said polymerization is carried out in an aqueous solution including from about 1 to about 10 percent by weight based on the total weight of the monomers of a dispersant polymer, said dispersant polymer being a water-soluble cationic polymer which is soluble in said aqueous solution of the polyvalent anionic salt and which contains at least 20 mole % of cationic monomer units represented by a general formula (II):

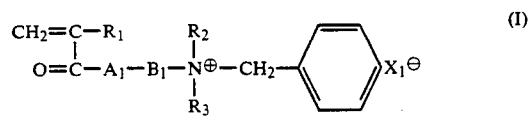

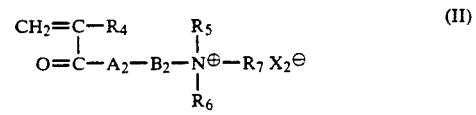

wherein $R_1$ and $R_4$ are each H or $CH_3$; $R_2$, $R_3$, $R_5$ and $R_6$ are each an alkyl group having 1 to 2 carbon atoms; $R_7$ is a hydrogen atom or an alkyl group having 1 to 2 carbon atoms; $A_1$ and $A_2$ are each an oxygen atom or NH; $B_1$ and $B_2$ are each 2 to 4 carbon atoms or a hydroxypropyl group and $X_1-$ and $X_2-$ are each a counter anion once treated, the emulsified water and dispersed solids flocculate; and removing the flocculated emulsified water and dispersed solids from the treated waste oil.

2. The method of claim 1 wherein said aqueous solution further includes a seed polymer; said seed polymer being a water-soluble cationic polymer which is insoluble in said aqueous solution of the polyvalent anionic salt and which contains at least 5 mole % of cationic monomer units represented by the general formula (I).

3. The method of claim 1 wherein the water-soluble monomer mixture further contains at least 5 mole % of a cationic monomer represented by the general formula (II).

4. The method of claim 1 wherein the polyvalent anionic salt comprises a phosphate, a sulfate or a mixture thereof.

5. The method of claim 1 wherein the effective amount of the dispersion of the water-soluble cationic polymer added to the waste oil fluid is at least 0.5 ppm.

6. The method of claim 1 wherein the effective amount of the dispersion of the water-soluble cationic polymer added to the waste oil fluid is at least 2 ppm.

7. The method of claim 1 wherein the effective amount of the dispersion of the water-soluble cationic polymer added to the waste oil fluid is at least 4 ppm.

* * * * *